(12) United States Patent
Cho et al.

(10) Patent No.: US 9,290,593 B2
(45) Date of Patent: Mar. 22, 2016

(54) POLYOLEFIN AND PREPARATION METHOD THEREOF

(71) Applicant: LG CHEM, LTD., Seoul (KR)

(72) Inventors: Joon-Hee Cho, Daejeon (KR); Ki-Soo Lee, Daejeon (KR); Yong-Gyu Han, Daejeon (KR); Dae-Sik Hong, Gunpo-si (KR); Heon-Yong Kwon, Daejeon (KR); Jong-Sang Park, Daejeon (KR); Seon-Kyoung Kim, Yongin-si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/094,365

(22) Filed: Dec. 2, 2013

(65) Prior Publication Data

US 2014/0094574 A1    Apr. 3, 2014

Related U.S. Application Data

(60) Division of application No. 13/337,972, filed on Dec. 27, 2011, now abandoned, which is a continuation-in-part of application No. 12/451,198, filed as application No. PCT/KR2008/002514 on May 2, 2008, now abandoned.

(30) Foreign Application Priority Data

May 2, 2007 (KR) .................. 10-2007-0042602

(51) Int. Cl.
| | |
|---|---|
| C08F 4/6592 | (2006.01) |
| C08F 4/653 | (2006.01) |
| C08F 210/16 | (2006.01) |
| C08L 23/08 | (2006.01) |
| C08F 210/14 | (2006.01) |
| C08F 4/659 | (2006.01) |
| C08F 10/00 | (2006.01) |
| C08F 210/08 | (2006.01) |

(52) U.S. Cl.
CPC ........... *C08F 210/14* (2013.01); *C08F 4/65904* (2013.01); *C08F 10/00* (2013.01); *C08F 210/08* (2013.01); *C08F 210/16* (2013.01); *C08L 23/08* (2013.01); *C08F 4/6592* (2013.01); *C08F 4/65912* (2013.01); *C08F 4/65916* (2013.01); *C08F 4/65925* (2013.01); *C08F 4/65927* (2013.01)

(58) Field of Classification Search
CPC .......... C08F 4/653; C08F 4/6592; C08L 23/08
USPC ................ 526/113, 114, 160, 161, 348, 943; 525/240
See application file for complete search history.

(56) References Cited

U.S. PATENT DOCUMENTS

| | | | |
|---|---|---|---|
| 4,935,474 A | 6/1990 | Ewen et al. | |
| 6,180,736 B1 | 1/2001 | Muhle et al. | |
| 6,492,473 B1 | 12/2002 | Canich et al. | |
| 6,841,631 B2 | 1/2005 | Loveday et al. | |
| 6,894,128 B2 | 5/2005 | Loveday et al. | |
| 6,911,508 B2 | 6/2005 | McCullough | |
| 7,060,765 B2 | 6/2006 | Vaughan et al. | |
| 7,078,467 B1 | 7/2006 | Kolb et al. | |
| 7,294,600 B2 | 11/2007 | Lee et al. | |
| 2007/0191559 A1 | 8/2007 | Kolb et al. | |
| 2008/0021183 A1 | 1/2008 | Graham et al. | |
| 2008/0045663 A1 | 2/2008 | Kolb et al. | |

FOREIGN PATENT DOCUMENTS

| | | |
|---|---|---|
| CN | 1545523 A | 11/2004 |
| CN | 1692473 A | 11/2005 |
| CN | 1697843 A | 11/2005 |
| KR | 1020000048952 | 7/2000 |
| KR | 1020040085650 | 10/2004 |
| KR | 10200798276 A | 10/2007 |
| KR | 10-2009-0063799 | * 6/2009 |
| WO | WO 2010/068045 | * 6/2012 |

OTHER PUBLICATIONS

"Glossy HDPE takes on PET in bottle market confrontation", Modern Plastics International, Aug. 1993, p. 45.

* cited by examiner

*Primary Examiner* — Caixia Lu
(74) *Attorney, Agent, or Firm* — Dentons US LLP (57) ABSTRACT

A polyolefin has 1) a density in the range of 0.93 to 0.97 g/cm$^3$, 2) a BOCD (Broad Orthogonal Co-monomer Distribution) index defined by a given equation in the range of 1 to 5, and 3) a molecular weight distribution (weight average molecular weight/number average molecular weight) in the range of 4 to 10. A supported hybrid metallocene catalyst comprises a first metallocene compound represented by a first given formulae, a second metallocene compound represented by one of three given formulae, and a support.

10 Claims, 2 Drawing Sheets

POLYOLEFIN AND PREPARATION METHOD THEREOF

This application is a Divisional application of U.S. application Ser. No. 13/337,972, filed on Dec. 27, 2011, which is a Continuation-In-Part of U.S. application Ser. No. 12/451,198, filed on Oct. 30, 2009, now abandoned, which is national stage application of PCT/KR2008/002514, filed on May 2, 2008, which claims priority to Korea Patent Application No. 10-2007-0042602, filed on May 2, 2007, all of which are incorporated herein by reference in their entirety.

TECHNICAL FIELD

The present invention relates to a polyolefin that has high environmental stress cracking resistance (ESCR), a high impact property, and an excellent die swell property, and a method of preparing the same.

BACKGROUND ART

In general, blow molding is a method in which preliminary molding is performed by using extrusion or injection to form a tube, this is provided in a mold, air is blown thereinto to swell the resulting structure, and cooling solidification is performed to obtain a molded body having a predetermined shape. The blow molding is largely classified into extrusion blow molding (extrusion or direct blow molding), injection blow molding, and stretch blow molding according to a preliminary molding method.

Hollow bottle products having a small thickness and various sizes, which contains liquid substances such as a liquid soap, a bleaching agent, an antifreezing solution, an engine oil, cosmetics, and medicines, are manufactured by using the blow molding. In the manufacturing of them, the high density polyethylene is mainly used, but the low density polyethylene may be used to manufacture a squeeze bottle. In addition, the high density polyethylene having the very high molecular weight is used to manufacture middle- and large-sized containers such as a soy sauce bottle, a mineral water bottle, chemical bottle and the like, and an ultra large-sized drum can.

In respects to the resin that is used in the blow molding, since a melt preliminary molded product (Parison) descends to a predetermined level while having a predetermined tension, it is required that the product has a predetermined melt tension in a melt state. In addition, since the high production rate reduces the cost, it is required that the melt index is low. In general, polyethylene having the melt index of 1.0 or less is used. In addition, it is required that the resin that is used to manufacture the chemical tub and the like has high chemical stability and environmental stress cracking resistance (ESCR).

Polyethylene is extensively used in order to manufacture molded products having various sizes. The reason for this is that polyethylene has excellent mechanical strength, full notch creep test, and chemical resistance and has a light weight.

Korean Patent Application No. 2000-0048952 discloses a linear low density polyethylene resin for blow molding which is polymerized by using a Ziegler catalyst and excellent impact resistance to falling and a desirable appearance, thus being used to manufacture food vessels such as soft bottles for mayonnaise, and a blow molded material manufactured by using the resin. However, in general, linear low density polyethylene has poor distortion strength due to low density and has a limit in application to products due to the frequent occurrence of sharkskin in the used bottles.

In general, high density polyethylene is extensively used to manufacture bottles for various purposes. The molecular weight distribution may be defined by a curve obtained from a gel permeation chromatography, and general high density polyethylene has very narrow molecular weight distribution of 8 or less. If a plastic vessel is manufactured by using the resin having the narrow molecular weight distribution, the manufactured vessel has very high luster but it is very difficult to process it. In addition, the resin having the narrow molecular weight distribution has poor mechanical properties, in particular, very low environmental stress cracking resistance (Modern Plastic International, August 1993, p 45). The molecular weight refers to weight average molecular weight herein.

U.S. Pat. No. 6,180,736 discloses a method of manufacturing polyethylene in a single gas phase reactor or a continuous slurry reactor by using one type of metallocene catalyst. When this method is used, there are advantages in that the production cost of polyethylene is low, fouling does not occur, and polymerization activity is stable. In addition, U.S. Pat. No. 6,911,508 discloses the manufacturing of polyethylene that is polymerized in a single gas phase reactor and has improved rheological properties by using a novel metallocene catalyst compound and 1-hexene as a comonomer. However, since polyethylene that is generated in the above-mentioned patents has a narrow molecular weight distribution, there are disadvantages in that it is difficult to ensure sufficient impact strength and processability.

U.S. Pat. No. 4,935,474 discloses a method of manufacturing polyethylene having a wide molecular weight distribution by using two or more metallocene compounds. In addition, U.S. Pat. Nos. 6,841,631 and 6,894,128 disclose that polyethylene having a bimodal or multimodal molecular weight distribution is prepared by using a metallocene catalyst containing at least two metal compounds, thus being used to manufacture films, pipes, and blow molded products. However, even though prepared polyethylene has improved processability, since the dispersion state according to the molecular weight in a unit particle is not uniform, an appearance is rough and physical properties are not stable under relatively desirable processing conditions.

Therefore, there is a need to manufacture an excellent resin in which a balance is ensured between physical properties or between physical properties and processability, and a demand for study regarding this is required.

DISCLOSURE

Technical Problem

Furthermore, it is an object of the present invention to provide a polyolefin that has a melt flow rate ratio (MFRR) that is useful to processing, excellent shapability, impact strength, tensile strength, in particular, environmental stress cracking resistance (ESCR) and full notch creep test (FNCT), and a high die swell property, a method of preparing the same, and a blow molded material including the polyolefin.

Technical Solution

Therefore, the present invention provides a polyolefin that has 1) a density in the range of 0.93 to 0.97 g/cm$^3$, 2) a BOCD (Broad Orthogonal Co-monomer Distribution) index defined by the following Equation 1 in the range of 1 to 5, and 3) a molecular weight distribution (weight average molecular weight/number average molecular weight) in the range of 4 to 10:

BOCD Index=(Content of SCB at the high molecular weight side−Content of SCB at the low molecular weight side)/(Content of SCB at the low molecular weight side) [Equation 1]

wherein the "Content of SCB at the high molecular weight side" means the content of the SCB (the number of branches/1000 carbon atoms) included in a polymer chain having a molecular weight of Mw of the polyolefin or more and 1.3× Mw or less, and the "Content of SCB at the low molecular weight side" means the content of the SCB (the number of branches/1000 carbon atoms) included in a polymer chain having a molecular weight of 0.7×Mw of the polyolefin or more and less than Mw.

Further, the present invention provides a supported hybrid metallocene catalyst, comprising a first metallocene compound represented by the following Formula 1, a second metallocene compound represented by the following Formulae 2, 3 or 4, and a support:

$(L^1)p(L^2)MQ_{3-p}$ [Formula 1]

wherein M is a Group 4 transition metal of the periodic table,

$L^1$ and $L^2$ are each independently a $C_{1\sim20}$ alkyl radical or a $C_{2\sim20}$ alkenyl radical, Q is a halogen radical, a $C_{1\sim20}$ alkyl radical, a $C_{2\sim20}$ alkenyl radical, a $C_{6\sim30}$ aryl radical, a $C_{7\sim30}$ alkylaryl radical, or a $C_{7\sim30}$ arylalkyl radical, and two Qs may form a $C_{1\sim20}$ hydrocarbon ring, p is 1 or 0,

[Formula 2]

[Formula 3]

[Formula 4]

wherein M is a Group 4 transition metal of the periodic table;

$R^3$, $R^4$ and $R^5$ are same or different from each other, and are each independently a $C_{1\sim20}$ alkyl radical, a $C_{2\sim20}$ alkenyl radical, a $C_{3\sim30}$ cycloalkyl radical, a $C_{6\sim30}$ aryl radical, a $C_{7\sim30}$ alkylaryl radical, a $C_{7\sim30}$ arylalkyl radical, or a $C_{8\sim30}$ arylalkenyl radical;

Q and Q' are same or different from each other, and are each independently a halogen radical, a $C_{1\sim20}$ alkyl radical, a $C_{2\sim20}$ alkenyl radical, a $C_{6\sim30}$ aryl radical, a $C_{7\sim30}$ alkylaryl radical, or a $C_{7\sim30}$ arylalkyl radical, and Q and Q' may form a $C_{1\sim20}$ hydrocarbon ring;

B is a ($C_{1\sim4}$ alkyl)C, (alkyl)Si, P and N, and a bridge that bonds two cyclopentadienyl ligands or cyclopentadienyl ligand and $JR^9_{z-y}$ by using a covalent bond;

$R^9$ is a hydrogen radical, a $C_{1\sim20}$ alkyl radical, a $C_{2\sim20}$ alkenyl radical, a $C_{6\sim30}$ aryl radical, a $C_{7\sim30}$ alkylaryl radical, or a $C_{7\sim30}$ arylalkyl radical;

J is a Group 15 or 16 element of the periodic table;

z is the number of oxidation of the element of J;

y is the incorporation number of the element of J;

a, a', n, and n' are same or different from each other, and are each independently a positive integer of 0 or more;

m is an integer in the range of 0 to 3;

o is an integer in the range of 0 to 2;

r is an integer in the range of 0 to 2;

Y is a hetero atom of O, S, N or P;

A is hydrogen or a $C_{1\sim10}$ alkyl radical;

R7s are the same as or different from each other, and are each independently selected from hydrogen and a methyl radical; and Q5 and Q6 are the same as or different from each other, and are each independently selected from a methyl radical and a chloride radical.

In addition, the present invention provides a method of preparing the polyolefin for blow molding by using a supported hybrid metallocene catalyst in which at least two different metallocene compounds are supported in one support, wherein a first metallocene compound, which is one of the metallocene compounds, is a compound represented by the following Formula 1, and a second metallocene compound, which is another type of the metallocene compounds, is a compound represented by the following Formulae 2, 3 or 4:

$(L^1)_p(L^2)MQ_{3-p}$ [Formula 1]

wherein M is a Group 4 transition metal of the periodic table, $L^1$ and $L^2$ are each independently a $C_{1\sim20}$ alkyl radical or a $C_{2\sim20}$ alkenyl radical,

Q is a halogen radical, a $C_{1\sim20}$ alkyl radical, a $C_{2\sim20}$ alkenyl radical, a $C_{6\sim30}$ aryl radical, a $C_{7\sim30}$ alkylaryl radical, or a $C_{7\sim30}$ arylalkyl radical, and two Qs may form a $C_{1\sim20}$ hydrocarbon ring, p is 1 or 0,

[Formula 2]

-continued

[Formula 3]

[Formula 4]

wherein M is a Group 4 transition metal of the periodic table;

$R^3$, $R^4$ and $R^5$ are same or different from each other, and are each independently a $C_{1\sim20}$ alkyl radical, a $C_{2\sim20}$ alkenyl radical, a $C_{3\sim30}$ cycloalkyl radical, a $C_{6\sim30}$ aryl radical, a $C_{7\sim30}$ alkylaryl radical, a $C_{7\sim30}$ arylalkyl radical, or a $C_{8\sim30}$ arylalkenyl radical;

Q and Q' are same or different from each other, and are each independently a halogen radical, a $C_{1\sim20}$ alkyl radical, a $C_{2\sim20}$ alkenyl radical, a $C_{6\sim30}$ aryl radical, a $C_{7\sim30}$ alkylaryl radical, or a $C_{7\sim30}$ arylalkyl radical, and Q and Q' may form a $C_{1\sim20}$ hydrocarbon ring;

B is a $(C_{1-4}$ alkyl)C, (alkyl)Si, P and N, and a bridge that bonds two cyclopentadienyl ligands or cyclopentadienyl ligand and $JR^9_{z-y}$ by using a covalent bond;

$R^9$ is a hydrogen radical, a $C_{1\sim20}$ alkyl radical, a $C_{2\sim20}$ alkenyl radical, a $C_{6\sim30}$ aryl radical, a $C_{7\sim30}$ alkylaryl radical, or a $C_{7\sim30}$ arylalkyl radical;

J is a Group 15 or 16 element of the periodic table;

z is the number of oxidation of the element of J;

y is the incorporation number of the element of J;

a, a', n, and n' are same or different from each other, and are each independently a positive integer of 0 or more;

m is an integer in the range of 0 to 3;

o is an integer in the range of 0 to 2;

r is an integer in the range of 0 to 2;

Y is a hetero atom of O, S, N or P;

A is hydrogen or a $C_{1\sim10}$ alkyl radical;

R7s are the same as or different from each other, and are each independently selected from hydrogen and a methyl radical; and Q5 and Q6 are the same as or different from each other, and are each independently selected from a methyl radical and a chloride radical.

In addition, the present invention provides a blow molded material that includes polyolefin.

Advantageous Effects

Polyolefin according to the present invention has a wide molecular weight distribution and bimodal or more molecular weight distribution curves, and the content of comonomer is mainly high in a region of the high molecular weight distribution. Therefore, polyolefin can be used to manufacture a blow molded goods that has a melt flow rate ratio (MFRR) that is useful to processing, excellent shapability, impact strength, tensile strength, in particular, environmental stress cracking resistance (ESCR) and full notch creep test (FNCT), and a high die swell property.

In a known process using two or more reactors to synthesize a polyethylene resin that has bimodal and multimodal molecular weight distributions, there are problems. However, in the present invention, it is easy to obtain a desired molecular weight distribution by using only a single reactor. Accordingly, even in a single gas phase reactor or a single loop slurry polymerization process in which products having the bimodal or multimodal molecular weight distribution and the excellent property cannot be obtained by using a known technology, various types of polyethylene products can be obtained. In particular, it is possible to obtain a novel polymer product having a BOCD structure. Thus, it is expected that the effect is very significant.

BEST MODE

Hereinafter, the present invention will be described in detail.

A polyolefin according to the present invention has 1) a density in the range of 0.93 to 0.97 g/cm³, preferably 0.94 to 0.96 g/cm³, more preferably 0.95 to 0.96 g/cm³, 2) a BOCD (Broad Orthogonal Co-monomer Distribution) index defined by the following Equation 1 in the range of 1 to 5, preferably 2 to 4, more preferably 2 to 3.5 and 3) a molecular weight distribution (weight average molecular weight/number average molecular weight) in the range of 4 to 10, preferably 5 to 8, more preferably 5 to 7:

BOCD Index=(Content of SCB at the high molecular weight side−Content of SCB at the low molecular weight side)/(Content of SCB at the low molecular weight side)  [Equation 1]

wherein the "Content of SCB at the high molecular weight side" means the content of the SCB (the number of branches/1000 carbon atoms) included in a polymer chain having a molecular weight of Mw of the polyolefin or more and 1.3× Mw or less, and the "Content of SCB at the low molecular weight side" means the content of the SCB (the number of branches/1000 carbon atoms) included in a polymer chain having a molecular weight of 0.7×Mw of the polyolefin or more and less than Mw.

In the term "BOCD index" that is used in the specification of the present invention, the term "BOCD" is a novel terminology that is currently developed and relates to a polymer structure. The term "BOCD structure" means a structure in which the content of the comonomer such as alpha olefins is mainly high at a high molecular weight main chain, that is, a novel structure in which the content of a short chain branching (SCB) is increased as moving toward the high molecular weight.

The contents of the molecular weight, the molecular weight distribution and the SCB may be simultaneously continuously measured by using a GPC-FTIR apparatus. The BOCD index is obtained by measuring the content of the SCB (unit:the number of branches/1,000 C) within left and right 30% (total 60%) range of the molecular weight distribution (MWD) based on the weight average molecular weight (Mw) and calculating the measured content by using the following Equation 1.

BOCD Index=(Content of SCB at the high molecular weight side−Content of SCB at the low molecular weight side)/(Content of SCB at the low molecular weight side) [Equation 1]

In the Equation 1, the "Content of SCB at the high molecular weight side" and the "Content of SCB at the low molecular weight side" can be defined as aforementioned.

If the BOCD index is 0 or less, the polymer may not have the BOCD structure. If the BOCD index is more than 0, the polymer may have the BOCD structure. It can be mentioned that the BOCD property is improved as the BOCD index is increased.

Figure 1:
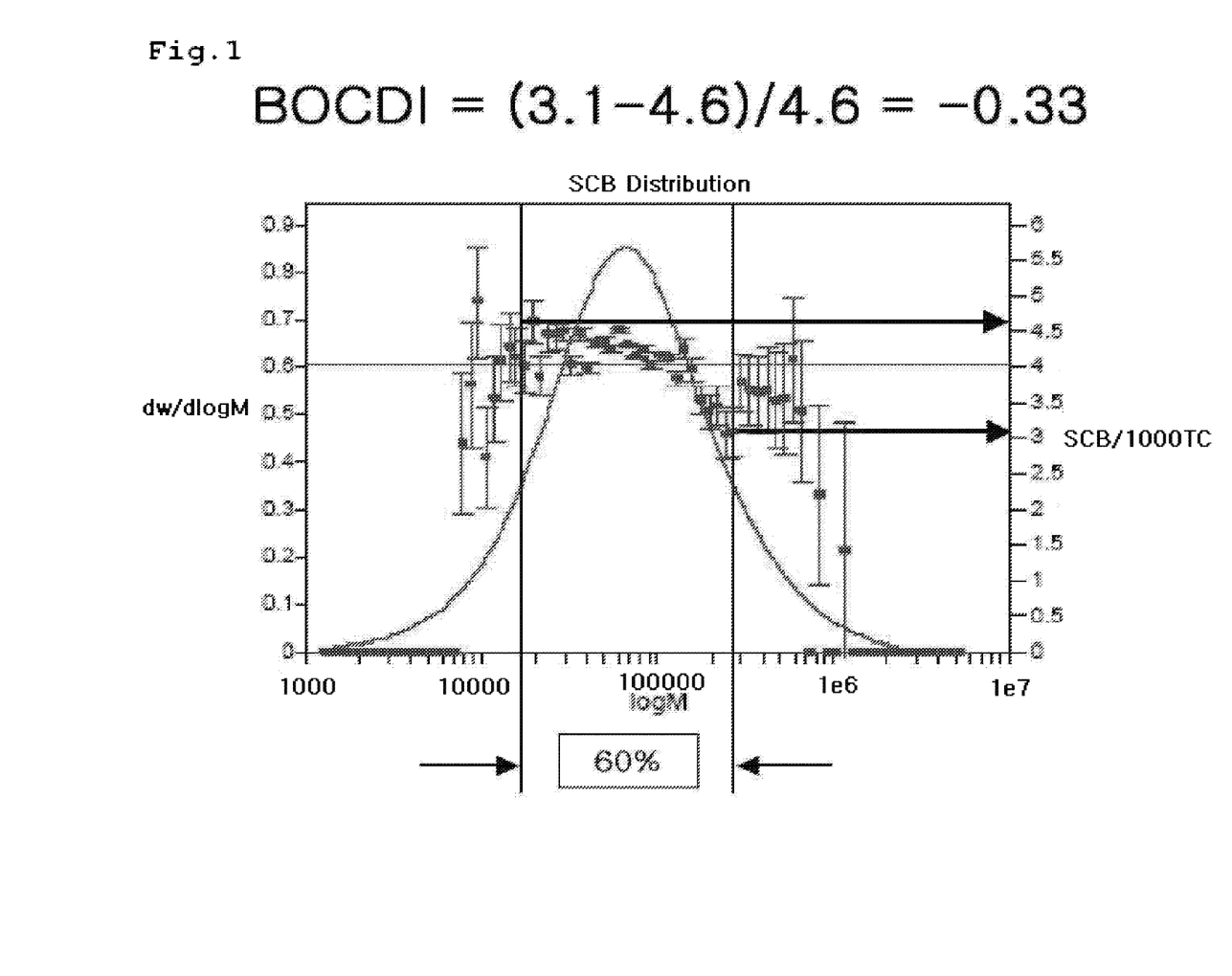
FIG. 1 is a view that illustrates the GPC-FTIR results and a BOCD Index of Comparative Example 4.
Figure 2:
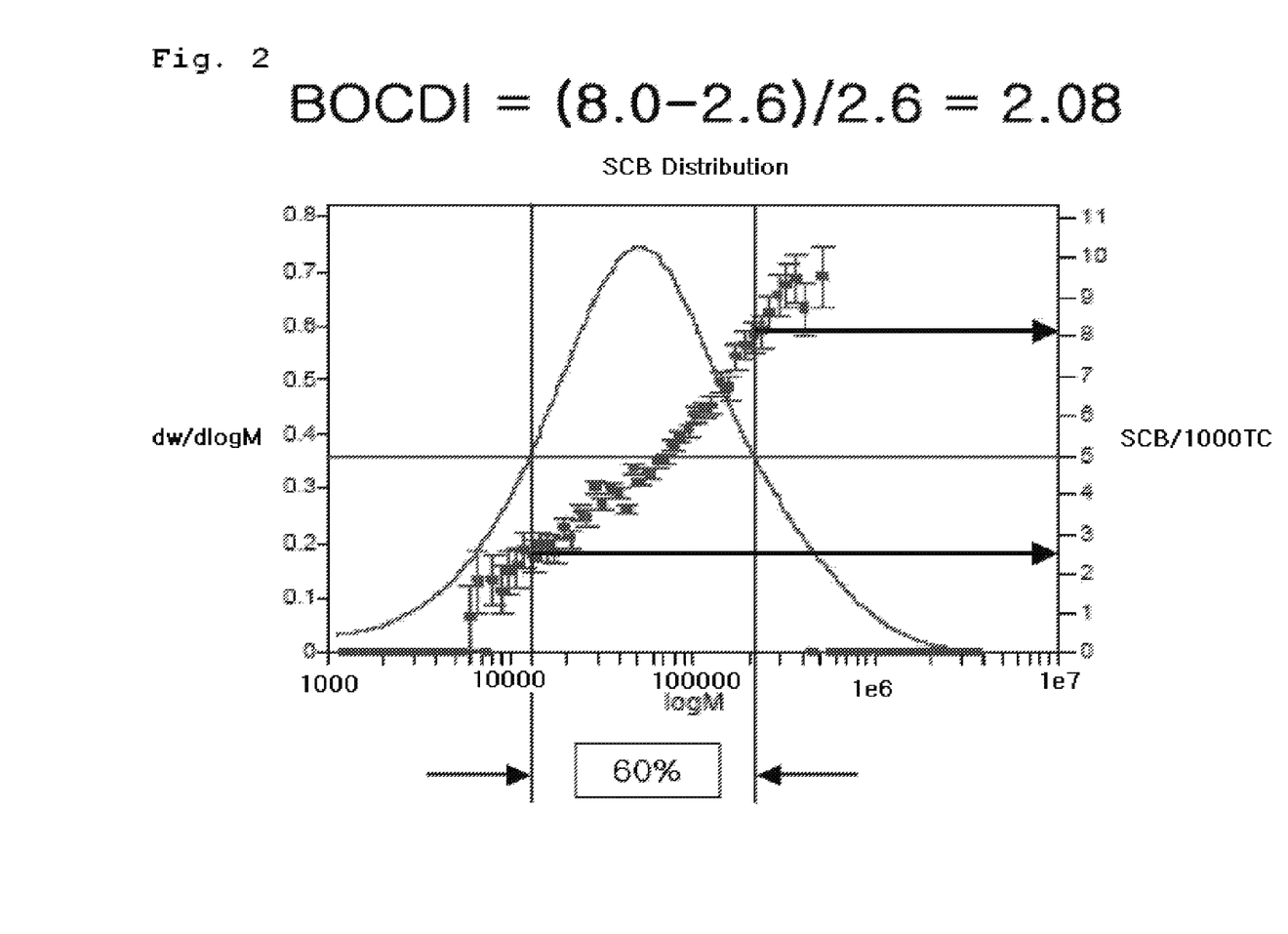
FIG. 2 is a view that illustrates the GPC-FTIR results and a BOCD Index of Example 2 according to the present invention.

For example, when a sample A and a sample B having different polymer structures are analyzed by using the GPC-FTIR, the results of FIGS. 1 and 2 can be obtained. In connection with this, it is deemed that since the sample A has the BOCD index of −0.33, the sample A is not the polymer having the BOCD structure, and since the sample B has the BOCD index of 2.08, the sample B is the polymer having the excellent BOCD structure.

In addition, it is preferable that the melt flow index (190° C., 2.16 kg load condition) of polyolefin according to the present invention be in the range of 0.05 to 2 g/10 min. In particular, when the melt flow index is in the range of 0.1 to 1 g/10 min, the melt flow index is preferable as the optimum point capable of harmonizing the shape processability and the mechanical property.

In addition, it is preferable that the melt flow rate ratio (MFRR) of the polyolefin of the present invention be in the range of 40 to 150 in views of an appearance, processability, and physical properties of the blow molded product. In addition, it is preferable that the die swell ratio of the polyolefin of the present invention be in the range of 70 to 95%.

In particular, since the polyolefin according to the present invention has the die swell ratio of 70 to 95% which is different from that of polyolefin used for other purposes, the polyolefin according to the present invention may be more preferably used for blow molding.

In addition, it is preferable that the polyolefin of the present invention have the SCB content of 0 to 6 per 1,000 carbon atoms of the polyolefin.

It is preferable that the polyolefin according to the present invention be a copolymer of an olefin monomer such as ethylene, propylene, 1-butene, 1-hexene, and 1-octene and an alpha olefin comonomer.

Alpha olefins having 4 or more carbon atoms may be used as the alpha olefin comonomer. Examples of the alpha olefin having 4 or more carbon atoms include 1-butene, 1-pentene, 1-hexene, 4-methyl-1-pentene, 1-octene, 1-decene, 1-dodecene, 1-tetradecene, 1-hexadecene, 1-octadecene, and 1-eicosene, but are not limited thereto. Among them, it is preferable to use alpha olefins having 4 to 10 carbon atoms, and one or more types of alpha olefins may be used as comonomers.

In the copolymer of the olefin monomer and the alpha olefin comonomer, the content of the olefin monomer is in the range of preferably 55 to 99.9% by weight, more preferably 80 to 99.9% by weight, and most preferably 96 to 99.9% by weight. The content of the alpha olefin comonomer is in the range of preferably 0.1 to 45% by weight, more preferably 0.1 to 20% by weight, and most preferably 0.1 to 4% by weight.

The density of the polyolefin of the present invention is affected by the amount of the used alpha olefin comonomer. That is, if the amount of the used alpha olefin comonomer is increased, the density is reduced, and if the amount of the used alpha olefin comonomer is reduced, the density is increased. It is preferable that the density of the polyolefin according to the present invention be in the range of 0.93 to 0.97 g/cm$^3$ in order to obtain the optimum physical properties of the blow molded product.

The weight average molecular weight of the polyolefin according to the present invention is preferably in the range of 80000 to 300000, but is not limited thereto.

The polyolefin according to the present invention may include additives. Specific examples of the additives include a thermal stabilizer, an antioxidant, a UV absorber, a light stabilizer, a metal inactivator, a filler, an intensifier, a plasticizer, a lubricant, an emulsifier, a pigment, an optical bleaching agent, a flame retardant, an antistatic agent, a foaming agent and the like. The type of the additives is not limited but a typical additive that is known in the art may be used.

The polyolefin according to the present invention can be used to manufacture a blow molded goods because the polyolefin has excellent processability, a melt flow rate ratio (MFRR) that is useful to processing, and excellent shapability, impact strength, tensile strength, in particular, environmental stress cracking resistance (ESCR), full notch creep test (FNCT), and die swell property.

In addition, according to the method of preparing the polyolefin of the present invention, a step of preparing polyolefin having bimodal or more molecular weight distribution curves in the presence of the supported hybrid metallocene catalyst in which at least two different metallocene compounds are supported in one support is included.

In the method of preparing the polyolefin according to the present invention, silica, silica-alumina, and silica-magnesia that are dried at a high temperature may be used as a support that is capable of being used to manufacture the supported hybrid metallocene catalyst, and they may generally include oxides such as $Na_2O$, $K_2CO_3$, $BaSO_4$, $Mg(NO_3)_2$, and carbonate, sulfate, nitrate components.

The amount of the hydroxyl group (—OH) on the surface of the support may be preferable as small as possible, but it is difficult to remove the entire hydroxyl group (—OH) in practice. Therefore, the amount of the hydroxyl group (—OH) is in the range of preferably 0.1 to 10 mmol/g, more preferably 0.1 to 1 mmol/g, and most preferably 0.1 to 0.5 mmol/g. The amount of the surface hydroxyl group (—OH) may be controlled by using a manufacturing condition or method of the support, or a drying condition or method (temperature, time, pressure and the like). In addition, in order to reduce side reactions caused by a small amount of hydroxyl group that remains after the drying, the support in which the siloxane group having the high reactivity, which is used to perform the supporting, remains but the hydroxyl group (—OH) is chemically removed may be used.

In the method of preparing the polyolefin according to the present invention, the supported hybrid metallocene catalyst may include at least two different compounds of the first metallocene compound and the second metallocene compound. The first metallocene compound may be represented by the following Formula 1 and the second metallocene compound may be represented by the following Formulae 2, 3 or 4.

$(L^1)_p(L^2)MQ_{3-p}$ [Formula 1]

wherein M is a Group 4 transition metal of the periodic table, $L^1$ and $L^2$ are each independently a $C_{1\sim20}$ alkyl radical or a $C_{2\sim20}$ alkenyl radical, Q is a halogen radical, a $C_{1-20}$ alkyl radical, a $C_{2-20}$ alkenyl radical, a $C_{6-30}$ aryl radical, a $C_{7-30}$ alkylaryl radical, or a $C_{7-30}$ arylalkyl radical, and two Qs may form a $C_{1-20}$ hydrocarbon ring, p is 1 or 0,

[Formula 2]

[Formula 3]

[Formula 4]

wherein M is a Group 4 transition metal of the periodic table;

$R^3$, $R^4$ and $R^5$ are same or different from each other, and are each independently a $C_{1-20}$ alkyl radical, a $C_{2-20}$ alkenyl radical, a $C_{3-30}$ cycloalkyl radical, a $C_{6-30}$ aryl radical, a $C_{7-30}$ alkylaryl radical, a $C_{7-30}$ arylalkyl radical, or a $C_{8-30}$ arylalkenyl radical;

Q and Q' are same or different from each other, and are each independently a halogen radical, a $C_{1-20}$ alkyl radical, a $C_{2-20}$ alkenyl radical, a $C_{6-30}$ aryl radical, a $C_{7-30}$ alkylaryl radical, or a $C_{7-30}$ arylalkyl radical, and Q and Q' may form a $C_{1-20}$ hydrocarbon ring;

B is a $(C_{1-4}$ alkyl)C, (alkyl)Si, P and N, and a bridge that bonds two cyclopentadienyl ligands or cyclopentadienyl ligand and $JR^9_{z-y}$ by using a covalent bond;

$R^9$ is a hydrogen radical, a $C_{1-20}$ alkyl radical, a $C_{2-20}$ alkenyl radical, a $C_{6-30}$ aryl radical, a $C_{7-30}$ alkylaryl radical, or a $C_{7-30}$ arylalkyl radical;

J is a Group 15 or 16 element of the periodic table;

z is the number of oxidation of the element of J;

y is the incorporation number of the element of J;

a, a', n, and n' are same or different from each other, and are each independently a positive integer of 0 or more;

m is an integer in the range of 0 to 3;

o is an integer in the range of 0 to 2;

r is an integer in the range of 0 to 2;

Y is a hetero atom of O, S, N or P;

A is hydrogen or a $C_{1-10}$ alkyl radical;

R7s are the same as or different from each other, and are each independently selected from hydrogen and a methyl radical; and Q5 and Q6 are the same as or different from each other, and are each independently selected from a methyl radical and a chloride radical.

In the method, the second metallocene compound represented by the Formula 4 may be [(6-methyl-1,2,3,4-tetrahydroquinolin-8-yl)trimethylcyclopentadienyl-ηη5,κ-N]TiCl$_2$.

Among the supported hybrid metallocene catalyst components, the first metallocene compound is mainly used to prepare the low molecular weight polyolefin, and the second metallocene compound is mainly used to prepare the high molecular weight polyolefin. Accordingly, it is possible to prepare the polyolefin having the bimodal or multimodal molecular weight distribution.

Intrinsic polyolefin that is capable of being obtained by using the first metallocene compound has a low molecular weight in the range of 1,000 to 100,000, polyolefin that is capable of being obtained by using the second metallocene compound has a high molecular weight in the range of 10,000 to 1,000,000, and it is preferable that the polyolefin capable of being obtained by using the second metallocene compound have the molecular weight that is higher than the molecular weight of the polyolefin capable of being obtained by using the first metallocene compound.

The supported hybrid metallocene catalyst is manufactured by using a method which includes a) bringing a supported metallocene catalyst in which at least one metallocene compound is supported into contact with a cocatalyst to manufacture an activated supported metallocene catalyst; and b) additionally supporting one or more metallocene compounds that are different from the metallocene compound in the activated supported metallocene catalyst.

For example, one type of the metallocene compound that leads the polyolefin having the low molecular weight and one type of the metallocene compound that leads the polyolefin having the high molecular weight are incorporated in one support in conjunction with the cocatalyst to manufacture the supported hybrid metallocene catalyst that has the molecular weight distribution capable of being easily controlled by the reaction in the single reactor.

Examples of the representative cocatalyst that can be used to activate the metallocene compound include alkylaluminum such as trimethylaluminum, triethylaluminum, triisobutylaluminum, trioctylaluminum, methylaluminoxane, ethylaluminoxane, isobutylaluminoxane, and butylaluminoxane, boron-based neutral or ionic compounds such as tripentafluorophenyl boron and tributylammoniumtetrapentafluorophenyl boron, but are not limited thereto. The content of the Group 4 transition metal of the periodic table in the supported hybrid metallocene catalyst that is finally manufactured in the present invention is in the range of preferably 0.1~20% by weight for olefin polymerization, more preferably 0.1 to 10% by weight, and most preferably 1 to 3% by weight. In the case of when the content of the Group 4 transition metal of the periodic table is more than 20% by weight, since the catalyst is separated from the support during the polymerization of olefin, there is a problem in that fouling occurs, and the case is commercially undesirable because the manufacturing cost is increased.

In addition, the cocatalyst includes a Group 13 metal of the periodic table, and the molar ratio of the Group 13 metal/Group 4 metal in the supported hybrid metallocene catalyst is preferably 1 to 10,000, more preferably 1 to 1,000, and most preferably 10 to 100.

In addition, it is preferable that the molar ratio of the second metallocene compound to the first metallocene compound is in the range of 0.5 to 2 in order to control the molecular weight distribution of the final polyolefin.

The molar ratio of the cocatalyst based on the metal included in the cocatalyst to the metal included in the first and second metallocene compounds is in the range of 1 to 10,000.

The supported hybrid metallocene catalyst may be used alone to perform the olefin polymerization, and may come into contact with the olefin monomer such as ethylene, propylene, 1-butene, 1-hexene, 1-octene and the like to perform the preliminary polymerization.

The supported hybrid metallocene catalyst according to the present invention may be diluted in a slurry form and then injected into an aliphatic hydrocarbon solvent having 5 to 12 carbon atoms such as iso-butane, pentane, hexane, heptane, nonane, decane, and isomers thereof; an aromatic hydrocarbon solvent such as toluene and benzene! and a hydrocarbon solvent that is substituted with a chlorine atom such as dichloromethane and chlorobenzene. It is preferable that the solvent be used while a small amount of water, air or the like acting as a catalyst poison is removed by performing the treatment by using a small amount of aluminum.

It is possible to manufacture the polyolefin copolymer having the bimodal or more molecular weight distribution curves by using the supported hybrid metallocene catalyst. When the supported hybrid metallocene catalyst is used, in particular, the copolymerization in respects to the alpha olefin is caused by the second metallocene compound for forming the high molecular weight portion, and the alpha olefin comonomer allows the manufacturing of the high performance polyolefin copolymer mainly connected to the high molecular weight chain to be possible.

The manufacturing of the polyolefin may be performed by using a continuous slurry polymerization reactor, a loop slurry reactor, a gas phase reactor, or a solution reactor according to a predetermined method while ethylene and alpha olefins having 4 or more carbon atoms as the comonomer are continuously supplied at a predetermined ratio.

When ethylene and high alpha olefin having 4 or more carbon atoms as the comonomer are copolymerized by using the supported hybrid metallocene catalyst according to the present invention, the polymerization temperature is in the range of preferably 25 to 500° C., more preferably 25 to 200° C., and most preferably 50 to 150° C. In addition, the polymerization pressure is in the range of preferably 1 to 100 Kgf/cm$^2$, more preferably 1 to 50 Kgf/cm$^2$, and most preferably 5 to 30 Kgf/cm$^2$.

The polyolefin copolymer according to the present invention is obtained by the copolymerization of the olefin monomer and alpha olefin having 4 or more carbon atoms by using the supported hybrid metallocene compound as the catalyst, and has the bimodal or multimodal molecular weight distribution. Since the polyolefin that is polymerized by using the metallocene catalyst has the side reactivity of the catalyst residuals, which is even lower than that of polyolefin that is polymerized by using the Ziegler-Natta catalyst, it is well known that the polyolefin that is polymerized by using the metallocene catalyst is excellent in terms of physical properties. However, in general, the molecular weights are uniform, the molecular weight distribution is narrow, and the distribution of the alpha olefin comonomers is uniform. Thus, there is a problem in that the workability is poor. In particular, the productivity is significantly reduced due to an extrusion load and the like in the extrusion blow molding and the like, and an appearance of the products is poor. Accordingly, there is a problem in that it is difficult to apply to the practical field.

That is, like the blow molded product, a resin having the excellent environmental stress cracking resistance (ESCR) and a high impact strength is required. In respects to a portion in which an increase in the molecular weight in order to improve the above-mentioned physical properties is necessary, the content of the comonomer in the high molecular weight part is absolutely insufficient. Thus, there is a difficulty in terms of processability.

However, if the supported hybrid metallocene catalyst of the present invention is used, it is possible to prepare the polyolefin that includes the low molecular weight and high molecular weight portions and has 4 to 10 molecular weight distributions, bimodal or multimodal molecular weight distribution curves, and the BOCD index in the range of 1 to 5. The prepared polyolefin has excellent processability during the formation of the products and the alpha olefin comonomers are mainly copolymerized in the high molecular weight ethylene chain. Accordingly, the polyolefin has excellent tensile strength, impact strength, environmental stress cracking resistance (ESCR), full notch creep test (FNCT), and die swelling property.

In addition, the present invention provides a blow molded material that includes polyolefin.

The blow molded material may be manufactured by using a method that is known in the art. For example, methods such as extrusion blow molding, injection blow molding, stretching blow molding and the like may be used.

In addition, specific examples of the blow molded material may include hollow bottle products having various sizes and a small thickness for containing liquid such as liquid soap, a bleaching agent, an antifreezing solution, an engine oil, cosmetics, medicines and the like, middle- and large-sized containers such as a soy sauce bottle, a mineral water bottle, chemical bottle and the like, and a ultra large-sized drum can.

MODE FOR INVENTION

A better understanding of the present invention may be obtained in light of the following Examples and Comparative Examples which are set forth to illustrate, but are not to be construed to limit the present invention.

EXAMPLE

As the organic reagent and the solvent that are required to prepare the catalyst and to perform the polymerization, products manufactured by Aldrich, Co., Ltd. were purified according to the standard method and used, and highly pure products manufactured by Applied Gas Technology, Co., Ltd. were passed through the water and oxygen filtering device and then used as ethylene. In all steps of the catalyst synthesis, the supporting, and the olefin polymerization, air and water contacts were blocked, thus increasing the reproducibility of the experiment.

To confirm the structure of the catalyst, the spectrum was obtained by using the 300 MHz NMR (Bruker). The apparent density was measured by using the apparent density tester (Apparent Density Tester 1132 manufactured by APT Institute fr Prftechnik, Co., Ltd.) according to the method of DIN 53466 and ISO R 60.

Preparation Example 1

Preparation of the First Metallocene Catalyst

Synthesis of [$^t$Bu-O—(CH$_2$)$_6$—C$_5$H$_4$]$_2$ZrCl$_2$ 6-chlorohexanol was used to prepare t-Butyl-O—(CH$_2$)$_6$—Cl according to the method that was described in the document (Tetrahedron Lett. 2951 (1988)), and NaCp was reacted in respects to this to obtain t-BUtYl-O—(CH$_2$)B—C$_5$H$_5$ (yield 60%, b.p. 80° C./0.1 mmHg). In addition, t-Butyl-O—(CH$_2$)$_6$—C$_5$H$_5$ was dissolved in THF at −78° C., normal butyl lithium (n-BuLi) was slowly added thereto, the temperature was increased to room temperature, and the reaction was performed for 8 hours. The solution was additionally reacted at room temperature for 6 hours while the synthesized lithium salt solution was slowly added to the suspension solution of ZrCl$_4$(THF)$_2$ (1.70 g, 4.50 mmoD/THF (30 ml) at −78° C. All the volatile substances were dried under vacuum, and the hexane solvent was added to the obtained oily liquid substance and then filtered. After the filtered solution was dried under vacuum, hexane was added thereto to induce the precipitate at the low temperature (−20° C.). The obtained precipitate was filtered at the low temperature to obtain the white solid [$^t$Bu-O—(CH$_2$)$_6$—C$_5$H$_4$]$_2$ZrCl$_2$ compound (yield 92%).

$^1$H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C NMR (CDCl$_3$): 135.09, 116.66, 112.28, 72.42, 61.52, 30.66, 30.61, 30.14, 29.18, 27.58, 26.00.

Preparation Example 2

Preparation of the First Metallocene Catalyst

Synthesis of [$^t$Bu-O—(CH$_2$)$_6$—C$_5$H$_4$]$_2$HfCl$_2$ 6-chlorohexanol was used to prepare t-Butyl-O—(CH$_2$)$_6$—Cl according to the method that was described in the document (Tetrahedron Lett. 2951 (1988)), and NaCp was reacted in respects to this to obtain t-Butyl-O—(CH$_2$)$_6$—C$_5$H$_5$ (yield 60%, b.p. 80° C./0.1 mmHg). In addition, t-Butyl-O—(CH$_2$)$_6$—C$_5$H$_5$ was dissolved in THF at −78° C., normal butyl lithium (n-BuLi) was slowly added thereto, the temperature was increased to room temperature, and the reaction was performed for 8 hours. The solution was additionally reacted at room temperature for 6 hours while the synthesized lithium salt solution was slowly added to the suspension solution of HfCl$_4$ (1.44 g, 4.50 mmoD/THF (30 mH) at −78° C. All the volatile substances were dried under vacuum, and the hexane solvent was added to the obtained oily liquid substance and then filtered. After the filtered solution was dried under vacuum, hexane was added thereto to induce the precipitate at the low temperature (−20° C.). The obtained precipitate was filtered at the low temperature to obtain the white solid [$^t$Bu-O—(CH$_2$)$_6$—C$_5$H$_4$]$_2$HfCl$_2$ compound (yield 88%).

$^1$H NMR (300 MHz, CDCl$_3$): 6.19 (t, J=2.6 Hz, 2H), 6.08 (t, J=2.6 Hz, 2H), 3.31 (t, 6.6 Hz, 2H), 2.65 (t, J=8 Hz), 1.56-1.48 (m, 4H), 1.34 (m, 4H), 1.17 (s, 9H).

$^{13}$C NMR (CDCl$_3$): 134.09, 116.06, 111.428, 72.42, 61.33, 30.42, 30.67, 30.14, 29.20, 27.52, 26.01.

Preparation Example 3

Preparation of the Second Metallocene Catalyst

Synthesis of [methyl(6-t-butoxyhexyl)silyl(η5-tetramethylCp)(t-Butylamido)]TiCl$_2$ After 50 g of Mg(s) was added to the 10 L reactor at normal temperature, 300 mL of THF was added thereto. After I$_2$ was added in an amount of about 0.5 g, the reactor temperature was maintained at 50° C. After the reactor temperature was stabilized, 250 g of 6-t-butoxyhexyl chloride was added to the reactor at a speed of 5 mL/min by using a feeding pump. According to the addition of 6-t-butoxyhexyl chloride, it was observed that the reactor temperature was increased by about 4 and 5° C. While 6-t-butoxyhexyl chloride was continuously added, the agitation was performed for 12 hours. The black reaction solution was obtained after reaction for 12 hours. After 2 mL of the formed black solution was sampled, water was added thereto to obtain the organic layer. Thus, 6-t-butoxyhexane was confirmed by using the $^1$H-NMR. Through 6-t-butoxyhexane, it could be seen that the Grignard reaction was well performed. Thereby, 6-t-butoxyhexyl magnesium chloride was synthesized.

After 500 g of MeSiCl$_3$ and 1 L of THF were added to the reactor, the reactor temperature was reduced to −20° C. 560 g of the synthesized 6-t-butoxyhexyl magnesium chloride was added to the reactor by using the feeding pump at a speed of 5 mL/min. After the injection of the Grignard reagent was finished, the reactor temperature was slowly increased to normal temperature and the agitation was performed for 12 hours. After the reaction was performed for 12 hours, it was confirmed that the white MgCl$_2$ salt was generated. 4 L of hexane was added and the salt was removed by using a press dehydrogenation filtration device for experiment (Iabdori, manufactured by Hangang Engineering, Co., Ltd.) to obtain the filter solution. After the filter solution was added to the reactor, hexane was removed at 70° C. to obtain the light yellow liquid. It was confirmed by using the $^1$H-NMR that the obtained liquid was methyl(6-t-butoxyhexyl)dichlorosilane compound.

$^1$H-NMR (CDCl$_3$): 3.3 (t, 2H), 1.5 (m, 3H), 1.3 (m, 5H), 1.2 (s, 9H), 1.1 (m, 2H), 0.7 (s, 3H).

After 1.2 mole tetramethylcyclopentadiene (150 g) and 2.4 L of THF were added to the reactor, the reactor temperature was reduced to −20° C. 480 mL of n-BuLi was added to the reactor by using the feeding pump at a speed of 5 niL/min. After n-BuLi was added, the reactor temperature was slowly increased to normal temperature and the agitation was performed for 12 hours. After the reaction was performed for 12 hours, an equivalent of methyl(6-t-butoxy hexyl) dichlorosilane (326 g, 350 mL) was rapidly added to the reactor. The reactor temperature was slowly increased to normal temperature and the agitation was performed for 12 hours. Next, the reactor temperature was reduced to 0° C., and 2 equivalent of t-BuNH$_2$ was added. The reactor temperature was slowly increased to normal temperature and the agitation was performed for 12 hours. After the reaction was performed for 12 hours, THF was removed, 4 L of hexane was added to obtain the filter solution from which the salt was removed by using the labdori. After the filter solution was added to the reactor, hexane was removed at 70° C. to obtain the yellow solution. It was confirmed by using the $^1$H-NMR that the obtained yellow solution was the methyl(6-t-butoxyhexyl)(tetramethylCpH)t-butylaminosilane compound.

TiCl$_3$(THF)$_3$ (10 mmol) was rapidly added to n-BuLi and the dilithium salt of the ligand at −78° C., which was synthesized from the ligand dimethyl(tetramethylCpH)t-butylaminosilane in the THF solution. The reaction solution was agitated for 12 hours while the temperature was slowly increased from −78° C. to normal temperature. After the agitation was performed for 12 hours, an equivalent of PbCl$_2$ (10 mmol) was added to the reaction solution at normal temperature and the agitation was performed for 12 hours. After the agitation was performed for 12 hours, the dark black solution having the blue color was obtained. After THF was removed from the generated reaction solution, hexane was added to filter the product. After hexane was removed from the filter solution, it was confirmed by using the $^1$H-NMR that the solution was the [methyl(6-t-butoxyhexyl)silyl(η5-tetramethylCp)(t-Butylamido)]TiCl$_2$ compound.

$^1$H-NMR (CDCl$_3$): 3.3 (s, 4H), 2.2 (s, 6H)$_1$ 2.1 (s, 6H), 1.8~0.8 (m), 1.4 (s, 9H), 1.2 (s, 9H), 0.7 (s, 3H)

Preparation Example 4

Preparation of the Second Metallocene Catalyst

Synthesis of [(6-methyl-1,2,3,4-tetrahydroquinolin-8-yl)trimethylCp-ηη5,κ-N]TiCl$_2$ The solution in which 6-methyl-1,2,3,4-tetrahydroquinoline (1.16 g, 7.90 mmol) was dissolved in carbon tetrachloride (4 mL) was cooled to −20° C. The N-bromosuccin imide (1.41 g, 7.90 mml) solid was slowly added thereto and the reaction temperature was increased to room temperature to further perform the reaction for 5 hours. The produced compound was subjected to the separation by using MC (methylene chloride) and hexane (v:v=1:1) solvents according to a column chromatography method to obtain the light yellow oil (0.71 g, 40%).

Degassed DME (dimethyl ether) (21 mL) and distilled water (7 mL) were added to the mixture of 2,3-dimethyl-5-oxocyclopent-I-enylboronic acid (1.27 g, 8.26 mmol), Na$_2$CO$_3$ (1.25 g, 11.8 mmol), Pd(PPh$_3$)$_4$ (0.182 g, 0.157 mmol), and 8-bromo-1,2,3,4-tetrahydro-6-methylquinoline (7.87 mmol) that was thusly synthesized to obtain the solution, and the solution was heated at 95° C. overnight. The temperature of the reaction solution was reduced to room temperature, and the extraction was performed twice by using the ethyl acetate solvent (50 mL). The obtained compound was subjected to the separation by using the hexane and ethyl acetate (2:1) solvent according to the column chromatography method to obtain the light yellow solid (90%).

After anhydrous La(OTf)$_3$ (21.4 mmol) and THF (24 mL) solutions were cooled to −78° C., MeLi (13.4 mL, 21.4 mmol) was added to perform the reaction for about 1 hour (OTf=trifluoromethanesulfonate). The 5-(3,4-dimethyl-2-cyclopentene-1-one)-7-methyl-1,2,3,4-tetrahydroquinoline (7.13 mmol) compound that was thusly synthesized was added thereto and reacted at −78° C. for 2 hours, and the extraction was performed by using water and the acetate solvent. The obtained organic layer was shaken by using HCl (2 N, 20 mL) for 2 min, neutralized by using the NaHCO$_3$ aqueous solution (20 mL), and dried by using MgSO$_4$. The obtained compound was subjected to the separation by using the hexane and ethyl acetate solvent (10:1) according to the column chromatography method to obtain the light yellow solid (40%).

The obtained 1,2,3,4-tetrahydro-6-methyl-8-(2,3,5-trimethylcyclopenta-1,3-dienyl) quinoline ligand (0.696 mmol) and Ti(NMe2)$_4$ compound (0.156 g, 0.696 mmol) were dissolved in toluene (2 mL), the reaction solution was reacted at 80° C. for 2 days, and all the solvents were removed to obtain the red solid compound (100%).

After toluene (2 mL) was added to the obtained red solid compound, Me$_2$SiCl$_2$ (0.269 g, 2.09 mmol) was added at room temperature to react the reaction solution for about 4 hours. The obtained compound was recrystallized under hexane at −30° C. to obtain the pure red solid (0.183 g, 66%).

$^1$H NMR (C$_6$D$_6$): δ 1.36-1.44 (m, 2H, CH2CH2CH2), 1.76 (s, 3H, CH3), 1.85 (s, 3H, CH3), 2.07 (s, 3H, CH3), 2.18 (s, 3H, CH3), 2.12 (t, J=4 Hz, 2H$_1$CH2), 4.50-4.70 (m, 2H$_1$N—CH2), 6.02 (s, IH, Cp-H), 6.59 (s, IH, C6H2), 6.78 (s, IH, C6H2) ppm.

$^{13}$C NMR (C$_6$D$_6$): δ 12.76, 14.87, 15.06, 21.14, 22.39, 26.32, 54.18, 117.49, 120.40, 126.98, 129.53, 130.96, 131.05, 133.19, 143.22, 143.60, 160.82 ppm.

Anal. Calc. (C$_{18}$H$_2$iCl$_2$NTi): C, 58.41; H, 5.72; N, 3.78%. Found: C, 58.19; H, 5.93; N, 3.89%.

Preparation Example 5

Preparation of the Supported Hybrid Metallocene Catalyst 1

Silica (XPO 2412 manufactured by Grace Davison, Co., Ltd.) was dehydrated under a vacuum at 800° C. for 15 hours. 1.0 g of silica was added to three glass reactors, 10 mL of hexane was added thereto, 10 mL of the hexane solution in which the "first metallocene" compound selected in Preparation Example 1 was dissolved was added, and the reaction was performed while the agitation was performed at 90° C. for 4 hours. After the reaction was finished, the agitation was finished, hexane was removed by the layer separation, the washing was repeated by using 20 mL of the hexane solution three times, pressure was reduced, and hexane was removed to obtain the solid powder. The methylaluminoxane (MAO) solution in which 12 mmol of aluminum was contained in the toluene solution was added thereto, the agitation was performed at 40° C., and the reaction was slowly performed. Next, the washing was performed by using a sufficient amount of toluene to remove the unreacted aluminum compound and pressure was reduced at 50° C. to remove remaining toluene. The solid thusly prepared may be used as the catalyst for olefin polymerization while not being treated any more. In order to prepare the mixed catalyst, the toluene solution of the "second metallocene" compound prepared in Preparation Example 3 was added to the glass reactor containing the supporting catalyst of the "first metallocene", and the reaction was performed while the agitation was performed at 40° C. Next, the washing was performed by using a sufficient amount of toluene and the vacuum drying was performed to obtain the solid powder. The final catalyst thusly prepared may be directly used for polymerization or for preliminary polymerization performed at normal temperature for 1 hour after the addition of ethylene under 30 psig for 2 min.

Preparation Example 6

Preparation of the Supported Hybrid Metallocene Catalyst 2

Silica (XPO 2412 manufactured by Grace Davison, Co., Ltd.) was dehydrated under a vacuum at 800° C. for 15 hours. 1.0 g of silica was added to three glass reactors, 10 mL of hexane was added thereto, 10 mL of the hexane solution in which the "first metallocene" compound selected in Preparation Example 2 was dissolved was added, and the reaction was performed while the agitation was performed at 90° C. for 4 hours. After the reaction was finished, the agitation was finished, hexane was removed by the layer separation, the washing was repeated by using 20 mL of the hexane solution three times, pressure was reduced, and hexane was removed to obtain the solid powder. The methylaluminoxane (MAO) solution in which 12 mmol of aluminum was contained in the toluene solution was added thereto, the agitation was performed at 40° C., and the reaction was slowly performed. Next, the washing was performed by using a sufficient amount of toluene to remove the unreacted aluminum compound and pressure was reduced at 50° C. to remove remaining toluene.

The solid thusly prepared may be used as the catalyst for olefin polymerization while not being treated any more. In order to prepare the mixed catalyst, the toluene solution of the "second metallocene" compound prepared in Preparation Example 3 was added to the glass reactor containing the supporting catalyst of the "first metallocene", and the reaction was performed while the agitation was performed at 40° C. Next, the washing was performed by using a sufficient amount of toluene and the vacuum drying was performed to obtain the solid powder. The final catalyst thusly prepared may be directly used for polymerization or for preliminary polymerization performed at normal temperature for 1 hour after the addition of ethylene under 30 psig for 2 min.

Preparation Example 7

Preparation of the Supported Hybrid Metallocene Catalyst 3

Silica (XPO 2412 manufactured by Grace Davison, Co., Ltd.) was dehydrated under a vacuum at 800° C. for 15 hours. 1.0 g of silica was added to three glass reactors, 10 mL of hexane was added thereto, 10 mL of the hexane solution in which the "first metallocene" compound selected in Preparation Example 1 was dissolved was added, and the reaction was performed while the agitation was performed at 90° C. for 4 hours. After the reaction was finished, the agitation was finished, hexane was removed by the layer separation, the washing was repeated by using 20 mL of the hexane solution three times, pressure was reduced, and hexane was removed to obtain the solid powder. The methylaluminoxane (MAO) solution in which 12 mmol of aluminum was contained in the toluene solution was added thereto, the agitation was performed at 40° C., and the reaction was slowly performed. Next, the washing was performed by using a sufficient amount of toluene to remove the unreacted aluminum compound and pressure was reduced at 50° C. to remove remaining toluene. The solid thusly prepared may be used as the catalyst for olefin polymerization while not being treated any more. In order to prepare the mixed catalyst, the toluene solution of the "second metallocene" compound prepared in Preparation Example 4 was added to the glass reactor containing the supporting catalyst of the "first metallocene", and the reaction was performed while the agitation was performed at 40° C. Next, the washing was performed by using a sufficient amount of toluene and the vacuum drying was performed to obtain the solid powder. The final catalyst thusly prepared may be directly used for polymerization or for preliminary polymerization performed at normal temperature for 1 hour after the addition of ethylene under 30 psig for 2 min.

Preparation Example 8

Preparation of the Supported Hybrid Metallocene Catalyst 4

Silica (XPO 2412 manufactured by Grace Davison, Co., Ltd.) was dehydrated under a vacuum at 800° C. for 15 hours. 1.0 g of silica was added to three glass reactors, 10 mL of hexane was added thereto, 10 mL of the hexane solution in which the "first metallocene" compound selected in Preparation Example 1 was dissolved was added, and the reaction was performed while the agitation was performed at 90° C. for 4 hours. After the reaction was finished, the agitation was finished, hexane was removed by the layer separation, the washing was repeated by using 20 mL of the hexane solution three times, pressure was reduced, and hexane was removed to obtain the solid powder. The methylaluminoxane (MAO) solution in which 12 mmol of aluminum was contained in the toluene solution was added thereto, the agitation was performed at 40° C., and the reaction was slowly performed. Next, the washing was performed by using a sufficient amount of toluene to remove the unreacted aluminum compound and pressure was reduced at 50° C. to remove remaining toluene. The solid thusly prepared may be used as the catalyst for olefin polymerization while not being treated any more. In order to prepare the mixed catalyst, the toluene solution of the other "first metallocene" compound prepared in Preparation Example 2 was added to the glass reactor containing the supporting catalyst of the "first metallocene", and the reaction was performed while the agitation was performed at 40° C. Next, the washing was performed by using a sufficient amount of toluene and the vacuum drying was performed to obtain the solid powder. The final catalyst thusly prepared may be directly used for polymerization or for preliminary polymerization performed at normal temperature for 1 hour after the addition of ethylene under 30 psig for 2 min.

Preparation Example 9

Preparation of the Supported Hybrid Metallocene Catalyst 5

Silica (XPO 2412 manufactured by Grace Davison, Co., Ltd.) was dehydrated under a vacuum at 800° C. for 15 hours. 1.0 g of silica was added to three glass reactors, 10 mL of hexane was added thereto, 10 mL of the hexane solution in which the "second metallocene" compound selected in Preparation Example 3 was dissolved was added, and the reaction was performed while the agitation was performed at 90° C. for 4 hours. After the reaction was finished, the agitation was finished, hexane was removed by the layer separation, the washing was repeated by using 20 mL of the hexane solution three times, pressure was reduced, and hexane was removed to obtain the solid powder. The methylaluminoxane (MAO) solution in which 12 mmol of aluminum was contained in the toluene solution was added thereto, the agitation was performed at 40° C., and the reaction was slowly performed. Next, the washing was performed by using a sufficient amount of toluene to remove the unreacted aluminum compound and pressure was reduced at 50° C. to remove remaining toluene. The solid thusly prepared may be used as the catalyst for olefin polymerization while not being treated any more. In order to prepare the mixed catalyst, the toluene solution of the other "second metallocene" compound prepared in Preparation Example 2 was added to the glass reactor containing the supporting catalyst of the "first metallocene", and the reaction was performed while the agitation was performed at 40° C. Next, the washing was performed by using a sufficient amount of toluene and the vacuum drying was performed to obtain the solid powder. The final catalyst thusly prepared may be directly used for polymerization or for preliminary polymerization performed at normal temperature for 1 hour after the addition of ethylene under 30 psig for 2 min.

<Preparation of the Polyolefin Copolymer and Evaluation of Properties>

The polyolefin copolymer was prepared by using the prepared supported hybrid metallocene catalyst under the conditions of Examples 1 to 6 and Comparative Examples 1 to 5 in the polymerization reactor according to a predetermined method. Evaluation items and evaluation methods of the obtained polyolefin copolymer are as follows. The blow molded product is a vessel having a volume of 780 ml, a weight of 25 g, and a thickness of 350 μm.

(Physical Properties of Raw Materials)

1) Density: The density was measured based on ASTM D1505.

2) Melt index (MI, 2.16 kg): The melt index was measured at a measurement temperature of 190° C. based on ASTM 1238.

3) MFRR (MFR20/MFR2): It is a ratio obtained by dividing MFR$_{20}$ Melt index (MI, 21.6 kg load) by MFR$_2$ (MI, 2.16 kg load).

4) Molecular weight, molecular weight distribution: Measurement temperature=160° C., the number average molecular weight, the weight average molecular weight, and the Z average molecular weight were measured by using the gel permeation chromatography-FTIR (GPC-FTIR). The molecular weight distribution was calculated by using the ratio of the weight average molecular weight and the number average molecular weight.

5) BOCD index: In respects to the analysis of the measurement results of the GPC-FTIR, the BOCD index was obtained by measuring the content of the SCB (unit:the number of branches/1,000 C) within left and right 30% (total 60%) range of the molecular weight distribution (MWD) based on the weight average molecular weight (Mw) and calculating the measured content by using the following Equation 1.

BOCD Index=(Content of SCB at the high molecular weight side−Content of SCB at the low molecular weight side)/(Content of SCB at the low molecular weight side) [Equation 1]

In the Equation 1, the "Content of SCB at the high molecular weight side" means the content of the SCB (the number of branches/1000 carbon atoms) included in a polymer chain having a molecular weight of Mw of the polyolefin or more and 1.3×Mw or less, and the "Content of SCB at the low molecular weight side" means the content of the SCB (the number of branches/1000 carbon atoms) included in a polymer chain having a molecular weight of 0.7×Mw of the polyolefin or more and less than Mw.

(Physical Properties of the Product)

1) Tensile strength, elongation: The tensile strength and the elongation were measured based on ASTM D 638. In connection with this, the test rate was 50 mm/min, the measurement was repeated 10 times per one sample, and the average value of the measured values was used.

2) Izod impact strength: The izod impact strength was measured at 23° C. according to ASTM D 256. The measurement was repeated 10 times per one sample, and the average value of the measured values was used.

3) Environmental stress cracking resistance (ESCR): The time required to approach F50 (50% breakage) was measured by using the 10% Igepal® CO-630 solution at the temperature of 50° C. according to ASTM D 1693.

4) Full notch creep test (FNCT): The test method for the full notch creep test of the molded composition of the present invention was disclosed in the document [M. Fleissner in Kunststoffe 77 (1987), pp. 45 et seq.], and this corresponds to ISO/FDIS 16770 that is currently in force. In respects to ethylene glycol that was the stress crack promotion medium using tension of 3.5 Mpa at 80° C., and the breakage time was reduced due to the reduction in tension initiation time by the notch (1.6 mm/safety razor blade). The sample was manufactured by sawing three samples having the size of 10 mm×10 mm×90 mm from the plate compressed to have the thickness of 10 mm. In order to achieve this object, the safety razor blade was used in the notch device specifically manufactured and the central notch was provided to the specimen. The depth of the notch was 1.6 mm.

5) Die swell ratio: In the Capillary Rheometer (Dynisco (Polymer Test), LCR7000), the diameter of the polymer melt strand was precisely measured at a position that was disposed at a distance of 9 cm from the die (D=1 mm, L/D=16) by using the laser detecter while the polymer melt was extruded at a predetermined extrusion rate (10 mm/min) at the temperature of 190° C., and the calculation was performed by using the following Equation 2.

Die swell ratio (%)=Diameter of the measured polymer melt−diameter of die (1 mm)/Diameter of die (1 mm)×100 [Equation 2]

(Processability of the Product)

1) Resin melt pressure: under the processing condition of the blow molded product, the resin melt pressure generated at an extrusion portion during the formation of the melt preliminary molded product was measured. The resin temperature was 200° C., the mold temperature was 20° C., and the extrusion rate of the resin was 50 kg/hr.

Example 1

The supported hybrid metallocene catalyst 1 that was obtained in Preparation Example 5 was provided in a single loop slurry polymerization process to prepare polyethylene for blow molding according to a predetermined method. 1-hexene was used as the comonomer. The obtained polyethylene copolymer was granulated by using the twin screw extruder (W&P Twin Screw Extruder, 75 phai, L/D=36) at the extrusion temperature in the range of 180 to 210° C. The extrusion blow molding was performed by using the extrusion blow molding device (Model: BA750 Cp$^{plus}$, Battenfeld, Co., Ltd. (Austria)) at the resin temperature of 200° C. and the mold temperature of 20° C. to mold the bottle having the inner volume of 780 ml, the weight of 25 g and the thickness of 350 μm (single-layered blow molded product). Physical properties of the raw materials of the polyethylene polymer and physical properties of the product were evaluated according to the property evaluation method of Example, and the results are described in Tables 2 and 3.

Example 2

The supported hybrid metallocene catalyst 2 that was obtained in Preparation Example 6 was provided in a single loop slurry polymerization process to prepare the polyethylene copolymer according to a predetermined method. 1-hexene was used as the comonomer. The granulation and the extrusion blow molding of the obtained polyethylene copolymer were performed by using the same procedure as Example 1, and the physical property evaluation results are described in Tables 2 and 3.

Example 3

The supported hybrid metallocene catalyst 3 that was obtained in Preparation Example 7 was provided in a single loop slurry polymerization process to prepare the polyethylene copolymer according to a predetermined method. 1-hexene was used as the comonomer. The granulation and the extrusion blow molding of the obtained polyethylene copolymer were performed by using the same procedure as Example 1, and the physical property evaluation results are described in Tables 2 and 3.

Example 4

The supported hybrid metallocene catalyst 3 that was obtained in Preparation Example 7 was provided in a single gas phase polymerization process to prepare the polyethylene copolymer according to a predetermined method. 1-butene was used as the comonomer. The granulation and the extrusion blow molding of the obtained polyethylene copolymer were performed by using the same procedure as Example 1, and the physical property evaluation results are described in Tables 2 and 3.

Example 5

The supported hybrid metallocene catalyst 3 that was obtained in Preparation Example 7 was provided in a single gas phase polymerization process to prepare the polyethylene copolymer according to a predetermined method. 1-hexene was used as the comonomer. The granulation and the extrusion blow molding of the obtained polyethylene copolymer were performed by using the same procedure as Example 1, and the physical property evaluation results are described in Tables 2 and 3.

Example 6

The supported hybrid metallocene catalyst 3 that was obtained in Preparation Example 7 was provided in a solution polymerization process to prepare the polyethylene copolymer according to a predetermined method. 1-octene was used as the comonomer. The granulation and the extrusion blow molding of the obtained polyethylene copolymer were performed by using the same procedure as Example 1, and the physical property evaluation results are described in Tables 2 and 3.

Comparative Example 1

Mixed catalyst of two types of metallocene catalysts prepared by Preparation examples 1 and 3 were provided in a single gas phase polymerization process to prepare the polyethylene copolymer according to a predetermined method. 1-hexene was used as the comonomer. The granulation and the extrusion blow molding of the obtained polyethylene copolymer were performed by using the same procedure as Example 1, and the physical property evaluation results are described in Tables 2 and 3.

Comparative Example 2

The one type of metallocene catalyst prepared by Preparation example 1 was provided in a single loop slurry polymerization process to prepare the polyethylene copolymer according to a predetermined method. 1-hexene was used as the comonomer. The granulation and the extrusion blow molding of the obtained polyethylene copolymer were performed by using the same procedure as Example 1, and the physical property evaluation results are described in Tables 2 and 3.

Comparative Example 3

The one type of metallocene catalyst prepared by Preparation example 3 was provided in a single solution polymerization process to prepare the polyethylene copolymer according to a predetermined method. 1-octene was used as the comonomer. The granulation and the extrusion blow molding of the obtained polyethylene copolymer were performed by using the same procedure as Example 1, and the physical property evaluation results are described in Tables 2 and 3.

Comparative Example 4

The metallocene supported hybrid catalyst 4 that was obtained in Preparation Example 8 was provided in a single loop slurry polymerization process to prepare the polyethylene copolymer according to a predetermined method. 1-hexene was used as the comonomer. The granulation and the extrusion blow molding of the obtained polyethylene copolymer were performed by using the same procedure as Example 1, and the physical property evaluation results are described in Tables 2 and 3.

Comparative Example 5

The metallocene supported hybrid catalyst 5 that was obtained in Preparation Example 9 was provided in a single loop slurry polymerization process to prepare the polyethylene copolymer according to a predetermined method. 1-hexene was used as the comonomer. The granulation and the extrusion blow molding of the obtained polyethylene copolymer were performed by using the same procedure as Example 1, and the physical property evaluation results are described in Tables 2 and 3.

TABLE 1

| (Comparative) Example No. | Used catalyst | Polymerization process | Comonomer |
| --- | --- | --- | --- |
| Example 1 | Supported hybrid metallocene catalyst 1 of Preparation example 5 using two types of metallocene catalysts prepared by Preparation examples 1 and 3 | Loop slurry | 1-hexene |
| Example 2 | Supported hybrid metallocene catalyst 2 of Preparation example 6 using two types of metallocene catalysts prepared by Preparation examples 2 and 3 | Loop slurry | 1-hexene |
| Example 3 | Supported hybrid metallocene catalyst 3 of Preparation example 7 using two types of metallocene catalysts prepared by Preparation examples 1 and 4 | Loop slurry | 1-hexene |
| Example 4 | Supported hybrid metallocene catalyst 3 of Preparation example 7 using two types of metallocene catalysts prepared by Preparation examples 1 and 4 | Gas phase process | 1-butene |

TABLE 1-continued

| (Comparative) Example No. | Used catalyst | Polymerization process | Comonomer |
|---|---|---|---|
| Example 5 | Supported hybrid metallocene catalyst 3 of Preparation example 7 using two types of metallocene catalysts prepared by Preparation examples 1 and 4 | Gas phase process | 1-hexene |
| Example 6 | Supported hybrid metallocene catalyst 3 of Preparation example 7 using two types of metallocene catalysts prepared by Preparation examples 1 and 4 | Solution process | 1-octene |
| Comparative Example 1 | Mixed catalyst of two types of metallocene catalysts prepared by Preparation examples 1 and 3, respectively. | Gas phase process | 1-hexene |
| Comparative Example 2 | A metallocene catalyst prepared by Preparation example 1 | Loop slurry | 1-hexene |
| Comparative Example 3 | A metallocene catalyst prepared by Preparation example 3 | Solution process | 1-octene |
| Comparative Example 4 | Supported hybrid metallocene catalyst 4 of Preparation example 8 using two first metallocene catalysts prepared by Preparation examples 1 and 2, respectively. | Loop slurry | 1-hexene |
| Comparative Example 5 | Supported hybrid metallocene catalyst 5 of Preparation example 9 using two second metallocene catalysts prepared by Preparation examples 3 and 4, respectively. | Loop slurry | 1-hexene |

TABLE 2

| (Comparative) Example No. | Density (g/cm$^3$) | Co-monomer (% by weight) | MI (2.16 kg) | MFRR | Molecular weight distribution (Mw/Mn) | BOCD Index |
|---|---|---|---|---|---|---|
| Example 1 | 0.958 | 1.3 | 0.3 | 76 | 5.8 (bimodal) | 2.6 |
| Example 2 | 0.958 | 1.2 | 0.3 | 71 | 5.3 (bimodal) | 2.1 |
| Example 3 | 0.958 | 1.3 | 0.3 | 84 | 6.1 (bimodal) | 3.0 |
| Example 4 | 0.957 | 1.6 | 0.2 | 87 | 6.4 (bimodal) | 3.5 |
| Example 5 | 0.958 | 1.4 | 0.2 | 82 | 6.0 (bimodal) | 3.0 |
| Example 6 | 0.960 | 1.0 | 0.7 | 77 | 5.9 (bimodal) | 2.7 |
| Comparative Example 1 | 0.958 | 1.3 | 0.3 | 68 | 5.7 (bimodal) | 1.38 |
| Comparative Example 2 | 0.960 | 1.1 | 0.3 | 16 | 3.2 (unimodal) | 0.02 |
| Comparative Example 3 | 0.959 | 0.8 | 0.3 | 17 | 3.4 (unimodal) | 0.03 |
| Comparative Example 4 | 0.952 | 1.8 | 0.4 | 73 | 4.9 (bimodal) | 0.7 |
| Comparative Example 5 | 0.952 | 2.1 | 0.4 | 85 | 3.5 (bimodal) | 0.1 |

TABLE 3

| (Comparative) Example No. | Yield point tensile strength (kg/cm$^2$) | Izod impact strength | Die Swell Ratio | Environmental stress cracking resistance (ESCR) | Full notch creep Test (FNCT) | Resin melt pressure (kgf/cm$^2$) |
|---|---|---|---|---|---|---|
| Example 1 | 312 | 50 | 87 | 350 | 240 | 270 |
| Example 2 | 304 | 47 | 84 | 322 | 197 | 300 |
| Example 3 | 325 | 65 | 88 | 480 | 306 | 260 |
| Example 4 | 325 | 80 | 90 | 500 | 340 | 268 |
| Example 5 | 325 | 72 | 88 | 475 | 300 | 290 |
| Example 6 | 350 | 38 | 80 | 220 | 140 | 245 |
| Comparative Example 1 | 300 | 30 | 76 | 95 | 70 | 340 |
| Comparative Example 2 | 300 | 20 | 70 | 70 | 60 | 400 |
| Comparative Example 3 | 300 | 25 | 71 | 90 | 68 | 390 |
| Comparative Example 4 | 260 | 47 | 70 | 200 | 120 | 260 |
| Comparative Example 5 | 300 | 40 | 70 | 190 | 100 | 270 |

From Tables 1 to 3, it can be seen that since the polyethylene copolymers obtained in Examples 1 to 3 is manufactured by using the supported hybrid metallocene catalyst, the copolymers each have the bimodal polymer distribution structure, the wide molecular weight distribution, and a structure in which the content of the comonomer is mainly high at the high molecular weight portion. Accordingly, when it is applied to the blow molded product, physical properties of the product, such as Izod impact strength, tensile strength and the like, are excellent, in particular, environmental stress cracking resistance (ESCR), full notch creep test (FNCT) and die swell property are high. In addition, since the copolymers each have the relatively high melt flow rate ratio (MFRR) and wide molecular weight distribution, the blow molding processability is excellent. However, as shown in Preparation Examples 5 to 7, a difference in molecular weight distribution and BOCD index occurs due to a difference in combination of the supported hybrid catalysts. Meanwhile, it can be seen that among three types of supported hybrid metallocene catalysts, the polyethylene copolymer prepared by using the supported hybrid metallocene catalyst 3 obtained in Preparation Example 7 has the widest molecular weight distribution and the high content of the comonomer at the high molecular weight portion, thus having excellent physical properties.

In addition, the polyethylene copolymer that was obtained in Examples 4 to 6 was prepared by changing the polymerization process and the comonomer using the supported hybrid metallocene catalyst 3 of Preparation Example 7. The polyethylene copolymers that were obtained in Examples 4 to 6 all have the bimodal and wide molecular weight distribution, and the content of the comonomer was mainly high at the high molecular weight portion. Thus, when the copolymers were used for blow molding, physical properties of the product, such as Izod impact strength, tensile strength and the like, were excellent. In particular, environmental stress cracking resistance (ESCR), full notch creep test (FNCT) and die swell property were high, and the blow molding processability were excellent.

Comparative Example 1 is the same as Examples because the metallocene catalyst is used. However, the catalyst in which two types of metallocene compounds are physically mixed with each other is used instead of the supported hybrid metallocene catalyst. Accordingly, after the polymerization, the polyethylene polymer is subjected to precise analysis. In result, there is a problem in that the alignment state of the polymer is not uniform in the unit volume. That is, the molecular weight distribution and the BOCD index are relatively good, but since the low molecular weight and the high molecular weight resin have the nonuniform distribution alignment form, physical properties of the product are poor, and physical properties of the product are not significantly improved even though the extrusion is performed under the relatively good condition.

In Comparative Examples 2 and 3, the catalyst that consists of one type of metallocene compound is used, and since the molecular weight distribution is narrow regardless of the type of loop slurry process and solution process, the processability is poor. In the case of when the used catalyst is the metallocene catalyst, the molecular weight distribution is slightly narrower as compared to the use of the Ziegler-Natta catalyst, and the BOCD Index is slightly higher as compared to the Ziegler-Natta catalyst. Meanwhile, physical properties of the product, in particular, environmental stress cracking resistance (ESCR) and full notch creep test (FNCT) are better in the case of when 1-octene of Comparative Example 3 is used as the comonomer than in the case of when 1-hexene of Comparative Example 2 is used as the comonomer.

In Comparative Examples 4 and 5, since the supported hybrid metallocene catalyst is used, the molecular weight distribution is wide compared to the Comparative Examples 2 and 3. However, the density is low, and the tensile strength at the yield point is poor as compared to Examples of the present invention. Further, since a difference in incorporation performance of the comonomer of two co-supported catalysts, the BOCD Index is less than 1. That is, the degree of inverse comonomer distribution is mild, and the ratio of the tie-molecules at the polymer portion to the low molecular weight portion is undesirably increased. Accordingly, even though the average density is low, physical properties such as ESCR are poor as compared to Examples of the present invention.

The invention claimed is:

1. A method of preparing a polyolefin using a supported hybrid catalyst in which at least two different transition metal catalyst compounds are supported in one support,
   wherein the polyolefin has 1) a density in the range of 0.93 to 0.97 g/cm$^3$, 2) a BOCD (Broad Orthogonal Co-monomer Distribution) index defined by the following Equation 1 in the range of 1 to 5, and 3) a molecular weight distribution (weight average molecular weight/number average molecular weight) in the range of 4 to 10:

BOCD Index=(Content of SCB at the high molecular weight side−Content of SCB at the low molecular weight side)/(Content of SCB at the low molecular weight side)    [Equation 1]

in the Equation 1, the "Content of SCB at the high molecular weight side" means the content of the SCB (the number of branches/1000 carbon atoms) included in a polymer chain having a molecular weight of Mw of the polyolefin or more and 1.3×Mw or less, and the "Content of SCB at the low molecular weight side" means the content of the SCB (the number of branches/1000 carbon atoms) included in a polymer chain having a molecular weight of 0.7×Mw of the polyolefin or more and less than Mw,
   wherein a first transition metal catalyst compound, which is one of the transition metal catalyst compounds, is selected from the group consisting of [t-Bu-O—(CH$_2$)$_6$—C$_5$H$_4$]$_2$ZrCl$_2$ and [t-Bu-O—(CH$_2$)$_6$—C$_5$H$_4$]$_2$HfCl$_2$, and a second transition metal catalyst compound, which is another type of the transition metal catalyst compounds, is a compound represented by the following Formula 4:

[Formula 4]

wherein
   R7s are the same as or different from each other, and are each independently selected from hydrogen and a methyl radical; and
   Q5 and Q6 are the same as or different from each other, and are each independently selected from a methyl radical and a chloride radical.

2. The method of preparing a polyolefin according to claim 1, wherein the first transition metal catalyst compound is a catalyst used to obtain a polyolefin having a low weight average molecular weight in the range of 1,000 to 100,000, the second transition metal catalyst compound is a catalyst used to obtain a polyolefin having a high weight average molecular weight in the range of 10,000 to 1,000,000, and the weight average molecular weight of the polyolefin obtained by the second transition metal catalyst compound is higher than the weight average molecular weight of the polyolefin obtained by the first transition metal catalyst compound.

3. The method of preparing a polyolefin according to claim 1, wherein the supported hybrid catalyst is manufactured by using a method which comprises:

a) bringing a supported transition metal catalyst in which at least one transition metal catalyst compound is supported into contact with a cocatalyst to manufacture an activated supported transition metal catalyst; and
b) additionally supporting one or more transition metal catalyst compounds that are different from the transition metal catalyst compound in the activated supported transition metal catalyst.

4. The method of preparing a polyolefin according to claim 3, wherein the cocatalyst comprises a Group 13 metal of the periodic table, and a molar ratio of the Group 13 metal/Group 4 metal of the supported hybrid catalyst is in the range of 1 to 10,000.

5. The method of preparing a polyolefin according to claim 3, wherein the cocatalyst is selected from the group consisting of trimethylaluminum, triethylaluminum, triisobutylaluminum, trioctylaluminum, methylaluminoxane, ethylaluminoxane, isobutylaluminoxane, butylaluminoxane, tripentafluorophenyl boron, and tributylammoniumtetrapentafluorophenyl boron.

6. The method of preparing a polyolefin according to claim 1, wherein the content of the Group 4 metal of the supported hybrid catalyst is in the range of 0.1 to 20% by weight.

7. The method of preparing a polyolefin according to claim 1, wherein the molar ratio of the second transition metal catalyst compound to the first transition metal catalyst compound in the supported hybrid catalyst is in the range of 0.5 to 2.

8. The method of preparing a polyolefin according to claim 1, wherein the supported hybrid catalyst further comprises the cocatalyst, and the molar ratio of the cocatalyst based on the metal included in the cocatalyst to the metal included in the first and second transition metal catalyst compounds is in the range of 1 to 10,000.

9. The method of preparing a polyolefin according to claim 1, wherein the polyolefin is prepared in a continuous slurry polymerization reactor, a loop slurry reactor, a gas phase reactor, or a solution reactor.

10. The method of preparing a polyolefin according to claim 1, wherein a polymerization temperature is in the range of 25 to 500° C., and a polymerization pressure is in the range of 1 to 100 Kgf/cm$^2$.

* * * * *